(12) United States Patent
Spits et al.

(10) Patent No.: US 12,726,281 B2
(45) Date of Patent: Sep. 1, 2026

(54) IN-DEVICE CHARACTERIZATION OF ANTENNA COUPLING

(71) Applicant: QUALCOMM Incorporated, San Diego, CA (US)

(72) Inventors: Erwin Spits, Utrecht (NL); Francesco Gatta, San Diego, CA (US); Adrianus Van Bezooijen, Molenhoek (NL); Leon Metreaud, Pepperell, MA (US); Hakan Inanoglu, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/950,075

(22) Filed: Sep. 21, 2022

(65) Prior Publication Data

US 2024/0097800 A1 Mar. 21, 2024

(51) Int. Cl.

| | |
|---|---|
| ***H04B 17/00*** | (2015.01) |
| ***H04B 17/12*** | (2015.01) |
| ***H04B 17/13*** | (2015.01) |
| ***H04B 17/21*** | (2015.01) |

(52) U.S. Cl.

CPC ......... *H04B 17/0085* (2013.01); *H04B 17/12* (2015.01); *H04B 17/13* (2015.01); *H04B 17/21* (2015.01)

(58) Field of Classification Search

CPC ...... H01Q 1/243; H01Q 1/50–52; H01Q 5/30; H04B 7/02–04; H04B 17/00; H04B 17/12; H04B 17/21

See application file for complete search history.

(56) References Cited

U.S. PATENT DOCUMENTS

| | | | | |
|---|---|---|---|---|
| 7,996,035 | B2 * | 8/2011 | Nguyen | H04B 1/0458 455/73 |
| 8,611,829 | B2 * | 12/2013 | Alberth | H04B 7/0602 455/193.1 |
| 8,626,083 | B2 * | 1/2014 | Greene | H01Q 5/314 343/745 |
| 9,401,738 | B2 | 7/2016 | Wang et al. | |
| 9,979,080 | B2 | 5/2018 | Van et al. | |
| 10,673,514 | B1 | 6/2020 | Klomsdorf | |
| 10,938,425 | B2 * | 3/2021 | Itkin | H04B 17/12 |
| 11,309,946 | B2 * | 4/2022 | Pehlke | H04B 1/006 |
| 11,469,498 | B2 | 10/2022 | Rafique | |
| 11,575,450 | B2 | 2/2023 | Verma et al. | |
| 12,126,091 | B2 * | 10/2024 | Wyckoff | H01Q 21/0006 |

(Continued)

FOREIGN PATENT DOCUMENTS

| | | | |
|---|---|---|---|
| CN | 216794987 | U | 6/2022 |
| EP | 2638640 | B1 | 5/2016 |

OTHER PUBLICATIONS

International Search Report and Written Opinion—PCT/US2023/033147—ISA/EPO—May 13, 2024.

(Continued)

*Primary Examiner* — Hasan Islam

(74) *Attorney, Agent, or Firm* — Polsinelli LLP

(57) ABSTRACT

A wireless communication device is provided with an in-device capability of characterizing the coupling between a pair of antennas. The wireless communication device determines the coupling through an operating gain measurement and through calibration gain measurements obtained through test ports.

13 Claims, 10 Drawing Sheets

(56) References Cited

U.S. PATENT DOCUMENTS

| | | | | |
|---|---|---|---|---|
| 2011/0116423 | A1 | 5/2011 | Rousu et al. | |
| 2015/0091776 | A1 | 4/2015 | Gaynor et al. | |
| 2017/0195106 | A1 * | 7/2017 | Pehlke | H04B 1/38 |
| 2018/0026664 | A1 * | 1/2018 | Greene | H04B 1/0057<br>370/252 |
| 2018/0132252 | A1 | 5/2018 | Islam et al. | |
| 2022/0407556 | A1 | 12/2022 | Braun et al. | |
| 2024/0097801 | A1 | 3/2024 | Spits et al. | |

OTHER PUBLICATIONS

Partial International Search Report—PCT/US2023/033147—ISA/EPO—Jan. 19, 2024.

* cited by examiner

IN-DEVICE CHARACTERIZATION OF ANTENNA COUPLING

FIELD OF TECHNOLOGY

The present disclosure relates generally to wireless communications and more specifically to a wireless device configured for an in-device characterization of antenna coupling.

BACKGROUND

To achieve ever higher data rates in modern wireless communication systems such as fifth generation (5G) systems, cellular handsets have evolved to employ an array of antennas. Using an array of antennas as compared to a single antenna has several advantages. For example, as the received signal strength drops, the signal-to-noise ratio becomes a limiting factor on the achievable data rate. But the use of multiple receive antennas enables multiple-in-multiple-out (MIMO) and beamforming techniques to increase the received signal strength and thus enhance the achievable data rate. Similarly, the use of multiple transmit antennas permits a transmitter to beamform and/or beam steer the transmitted signal to achieve higher data rates.

As the number of transmit and receive antennas in a user equipment (UE) increases, the coupling among antennas may also become stronger. For example, a transmit antenna may couple to a receive antenna such that transmit power is then dissipated in a low-noise amplifier coupled to the receive antenna. The coupling thus causes a loss in total radiated power (TRP). But each transmit and receive antenna in a UE may have a unique orientation and position within the UE, which results in different coupling levels between any two antennas. Moreover, the antenna coupling may change depending upon how a user handles the UE. In addition, beamsteering of the transmit antennas and/or the receive antennas may change the coupling. Another issue that relates to antenna coupling is self-interference such that a transmit signal affects receiver sensitivity or couples into other transmit paths to cause mutual power amplifier distortion. The coupling between antennas in a UE is thus problematic.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an apparatus for wireless communication is provided that includes: a plurality of antennas including a first antenna and a second antenna; a first antenna tuner coupled to the first antenna; a second antenna tuner coupled to the second antenna; a transmitter; a receiver; an antenna switch array having a first configuration in which the transmitter is coupled through the antenna switch array to drive the first antenna through the first antenna tuner and in which the second antenna tuner is coupled to a receiver node; a first switch coupled between the receiver node and a receive path in the receiver; and a second switch coupled between the receiver node and a matched load.

In accordance with another aspect of the disclosure, a user equipment (UE) for wireless communication is provided that includes: a plurality of antennas including a first antenna and a second antenna; a transmitter including a transmit path; a receiver including a receive path; a transmission line; and a plurality of switches configurable into a first configuration in which the transmit path is coupled to the receive path through the transmission line and in which the first antenna and the second antenna are isolated from the transmit path and the receive path, the plurality of switches being further configurable into a second configuration in which the transmit and receive paths are coupled to respective ones of the first antenna and the second antenna and in which the transmission line is isolated from the transmit and receive paths.

In accordance with another aspect of the disclosure, an apparatus for wireless communication is provided that includes: a plurality of antennas including a first antenna and a second antenna; a transmitter including a transmit path; a receiver including a receive path; an antenna switch array configurable into a first configuration in which the transmit path is coupled through the antenna switch array to drive the first antenna and in which the receiver is coupled through the antenna switch array to receive from the second antenna; and a controller configured to measure an operating gain between the transmit path and the receive path while the antenna switch array is in the first configuration, the controller being further configured to estimate a coupling gain between the first antenna and the second antenna based upon the operating gain, a calibration transmit gain of the transmit path, and a calibration receive gain of the receive path.

In accordance with yet another aspect of the disclosure, a method for wireless communication is provided that includes: transmitting a first signal through a transmitter chain to a first antenna of a user equipment; varying a loading of a second antenna of the user equipment through each load value in a first plurality of load values during the transmitting of the first signal; measuring a reflection coefficient of the transmitter chain for each load value in the first plurality of load values to provide a first plurality of measured reflection coefficients during the transmitting of the first signal; and calculating a first coupling factor between the first antenna and the second antenna based upon the first plurality of measured reflection coefficients and the first plurality of load values.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
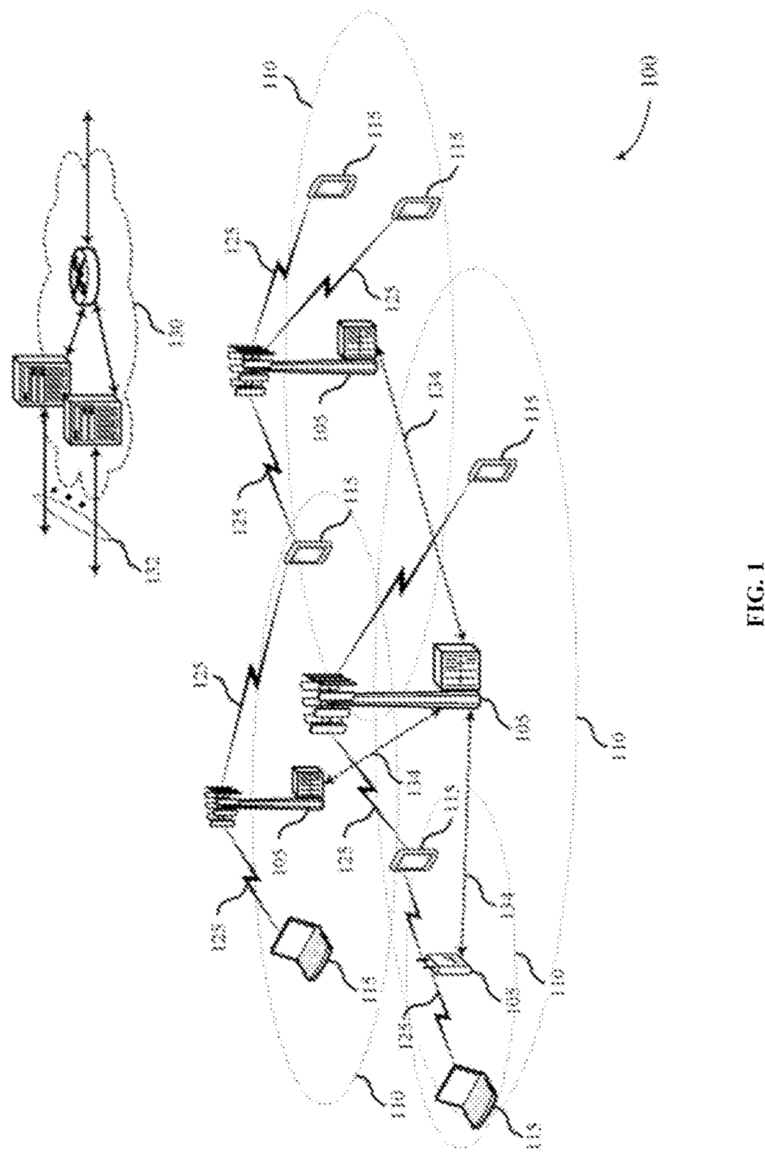
FIG. 1 illustrates an example of a system for wireless communication that supports in-device antenna coupling characterization in accordance with aspects of the present disclosure.

The following detailed description is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A wireless communication device (e.g., a user equipment (UE)) is provided with built-in or in-device antenna coupling characterization. In general, to characterize the antenna couplings in an antenna array, a UE could be modified so that transmission lines (e.g., coaxial cables) are soldered to each antenna port. A vector network analyzer (VNA) could then couple to the coaxial cables to characterize the antenna couplings across the array. An issue with such a measurement is that it may be cumbersome and invasive to solder the coaxial cables. In addition, it may be difficult to avoid antenna-to-cable couplings that pollute the desired antenna-to-antenna coupling measurements. The in-device characterizations disclosed herein avoid the need for such complications and inaccuracies. Several implementations to provide an in-device antenna coupling characterization will now be introduced and are also discussed further herein.

In a first implementation also denoted herein as an antenna-tuner-based in-device characterization, a transmitter transmits a signal through a first antenna in the antenna array while an antenna tuner coupled to a second antenna in the array is sequentially set to different loads. At each load, a directional coupler in a transmit path between a power amplifier in the transmitter and the first antenna samples a forward signal and a reflected signal. The forward signal is the signal intended to be transmitted by the first antenna as the signal propagates over the transmit path from the power amplifier to the first antenna. The reflected signal is a portion of the forward signal that reflects from the first antenna and propagates from the first antenna over the transmit path towards the power amplifier. A signal detector detects the samples of the forward signal and the reflected signal at each load value of the second antenna's tuner so that a controller may form a ratio of the detected reflected signal sample to the detected forward signal sample. The controller thus determines a reflection coefficient (the ratio of the detected reflected signal sample to the detected forward signal sample) for each of the load values for the second antenna's tuner.

The first antenna's port and the second antenna's port may be deemed to form a two-port network. There are four scattering parameters in such a two-port network. A first scattering parameter $S_{11}$ represents how much power is reflected from the first port. A second scattering parameter $S_{22}$ represents how much power is reflected from the second port. A third scattering parameter $S_{21}$ represents how much power is coupled from the first port to the second port whereas a fourth scattering parameter $S_{12}$ represents how much power is coupled from the second port to the first port. The scattering parameters $S_{21}$ and $S_{12}$ are equal because the first and second antennas are passive structures. There are thus three unknown scattering parameters that may be determined to fully characterize the two-port network: $S_{11}$, $S_{22}$, and $S_{21}$. From three reflection coefficients and three known loads, the controller may calculate these three scattering parameters. Advantageously, the antenna tuner setting the load for the second antenna is adjacent the second antenna's port and may have a relatively low insertion loss. The second antenna's tuner may thus set relatively extreme impedances (towards the unit circle when plotted on a Smith chart). A relatively weak scattering parameter $S_{21}$ may thus be recovered using the three loads of the second antenna's tuner. With the antenna coupling being described by $S_{21}$, the UE may then tune or detune its antennas as necessary.

In a second implementation also denoted herein as a calibration path in-device characterization, the UE may cycle through a gain detection mode and a reflection coefficient mode to compute scattering parameters for the pair of antennas. In both modes, the respective tuners for the first and second antennas are tuned for good power transfer such as established through open, short, and load (OSL) calibrations. As in the first implementation, the port to the first antenna is coupled to a corresponding antenna tuner. Similarly, the port to the second antenna is coupled to a corresponding antenna tuner. A transmit path and a receive path for the UE couple through an antenna switch array to respective selected ones of the first and second antennas. In a first configuration of the antenna switch array denoted herein as a through configuration, the transmit path couples to the first antenna whereas the receive path couples to the second antenna. In a second configuration of the antenna switch array denoted herein as a cross configuration, the transmit path couples to the second antenna whereas the receive path couples to the first antenna.

The UE includes a calibration path or transmission line that may be selected during the gain detection mode through corresponding calibration path switches such that the transmit path is isolated from the first antenna and instead couples to the calibration path. The second antenna is in turn isolated from the receive path that would otherwise couple the second antenna to a low-noise amplifier (LNA) in the UE's receiver. The antenna switch array is in the through configuration during the gain detection mode. During a first gain detection in the gain detection mode, the calibration path couples between the transmit path and the receive path while the first and second antennas are isolated. The UE may thus determine a calibration gain as defined by a ratio of a baseband receive signal recovered from an RF signal received over the receive path during the calibration mode to a baseband transmit signal converted into the RF signal that is then propagated down the transmit path to the first antenna. The UE may similarly determine a coupling gain when the calibration path is not selected from a ratio of the baseband receive signal to the baseband transmit signal.

During the reflection coefficient mode, a directional coupler in the transmit path functions analogously as discussed with respect to the antenna-tuner-based implementation so that a reflection coefficient may be measured. The calibration path is not used during the reflection coefficient mode. The calibration path is thus isolated from the transmit and receive paths. In a first reflection coefficient measurement, the antenna switch array is in the through configuration. In a second reflection coefficient measurement, the antenna switch array is in the cross configuration. From the two gain measurements of the gain detection mode and the two reflection coefficient measurements of the reflection coefficient mode, the UE may determine the scattering parameters including S21. The resulting determination of the scattering parameters is quite advantageous in that it de-embeds the effect of the antenna tuners. In that regard the calibration path is upstream to the antenna tuners such that the antenna tuners are isolated from the gain measurement when the calibration path is selected. With regard to this isolation, it is advantageous if the calibration path couplings to the transmit and receive path occurs between the antenna switch array and the antenna tuner so that the de-embedding is more accurate. However, in alternate implementations, the calibration path may be upstream from the antenna switch array.

In a third implementation also denoted herein as a gain-calibration-based in-device characterization, the transmit chain and receive chain (or a feedback receive chain) are calibrated using test equipment at test connectors such as just upstream of the antenna tuners at the ports of the antennas. A transmit calibration gain measurement measures a calibration transmit gain between the baseband transmit signal and the resulting signal at the transmit test port. A receive calibration gain measurement measures a calibration receive gain between a baseband receive signal at the receiver and a receive test port. During normal operation of the UE following these calibration measurements, the UE converts a transmit baseband signal into an RF signal, transmits the RF signal over the first antenna, receives a coupled RF signal over the second antenna, and converts the coupled RF signal into a baseband receive signal so that an operating gain as defined by a ratio of the baseband receive signal to the baseband transmit signal may be determined. From the operating gain, the calibration receive gain, and the calibration transmit gain, the UE may estimate the coupling between the first and second antennas.

To provide a deeper appreciation of the advantageous properties of the in-device antenna coupling characterizations disclosed herein, aspects of the disclosure are initially described with respect to an example wireless communications system. FIG. 1 illustrates an example wireless communication system 100 that supports in-device antenna coupling characterization. The wireless communications system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices. The techniques described herein may be applicable to positioning in 5G NR and future releases, and/or may be applicable to detection of a user of a UE 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like, and/or may be able to communicate directly with each other.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

One or more of the UEs 115 supports in-device antenna characterization as will be explained further herein. UEs 115 may be dispersed throughout the wireless communication system 100, and each UE 115 may be stationary or mobile. A UE 115 may also be referred to as a mobile device, a wireless communication device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Wireless communication system 100 may operate using one or more frequency bands, such as in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the lower frequencies and longer wavelengths of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz or higher), also known as the millimeter band (which may also include some frequencies in the 20 GHz range in certain systems). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions.

Each UE 115 is equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105 in downlink) and a receiving device (e.g., a UE 115 in downlink), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

Figure 2:
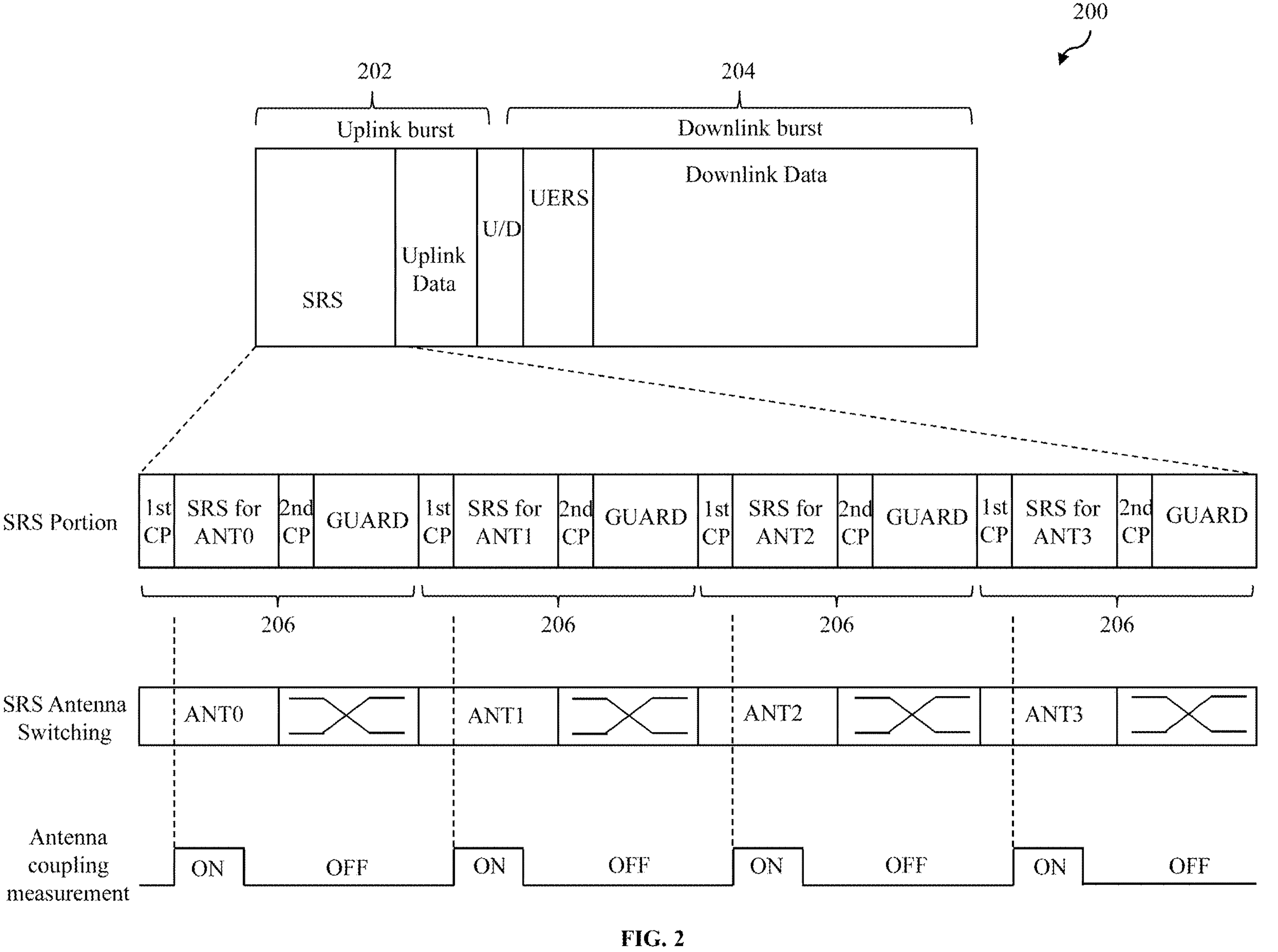
FIG. 2 illustrates an example subframe structure that includes sounding reference signals for an in-device antenna coupling characterization in accordance with aspects of the present disclosure.

Communications between a UE 115 and a base station 105 can be divided in time domain into subframes (SFs). Referring now to FIG. 2, an example SF 200 is illustrated that allocates a multiplexed sounding reference signal (SRS). In an embodiment, the subframe structure 200 operates within a short timeframe of approximately 500 microseconds, though it may also be shorter or longer than that. The short timeframe allows the base station 105 to essentially "freeze" the channel state for the duration of the subframe to minimize the effects of channel decorrelation.

The in-device antenna coupling characterization described herein is not limited to any particular type of transmitted signal. The following discussion of the use of an SRS as the transmitted signal used during the in-device antenna coupling characterization is thus merely exemplary. It is convenient, however, to use an SRS as the transmitted signal during in-device antenna coupling characterization since the SRS in a 5G system is sequenced through each TX and RX antenna. If the in-device antenna coupling characterization computations are performed during an SRS transmission, the in-device antenna coupling characterization needs add no additional latency as compared to conventional SRS operation.

A single subframe 200 is illustrated in FIG. 2 for ease of illustration; as will be recognized, the structure of the SF 200 is scalable to any number of subframes as necessary or desired. Each SF 200 includes a plurality of time slots 206 with each time slot 206 including a plurality of orthogonal frequency division multiplexing (OFDM) symbols. The various time slots 206 in a SF 200 may be divided into an uplink portion 202 and a downlink portion 204, separated by a transition portion U/D. As part of the uplink portion 202, the UE 115 may send various types of signals to the base station 105. These may include, for example, an SRS, uplink data, and optionally requests for information (e.g., in an uplink burst). The transition portion U/D is provided between the uplink portion 202 and the downlink portion 204. During the downlink portion 204, the base station 105 sends various types of signals to the UE 115, including for example a user-equipment reference signal (UERS) and downlink data (e.g., in a downlink burst). In some embodiments, the base station 105 may use the SRS in the UL portion 202 to derive information that facilitates the downlink between the UE 115 and the base station 105. For example, the base station 105 is able to train its antennas based on the SRS to beamform the downlink data transmitted back to the UE 115 so that, for instance, interference with other UEs in the range of the base station 105 is reduced.

Inside a time slot 206, an SRS may span one, two, or four consecutive OFDM symbols that are located within the last six OFDM symbols of the time slot 206. Each antenna may transmit its own SRS such that the sounding reference signals are multiplexed across a UE's antennas, each antenna having its own SRS in a corresponding time slot 206. Each slot 206 may contain a first cyclic prefix (CP) prepended to the OFDM symbols for the multiplexed SRS. Each slot 206 may also contain a second CP prepended to a guard period before the next slot starts. The guard period ensures enough time for the UE 115 to perform SRS antenna switching. Also illustrated in FIG. 2 is the timing of SRS antenna switching and in-device antenna coupling characterization. At the beginning of a slot 206, an SRS-switching antenna switch is configured to couple a transmitter path to the selected antenna to prepare for transmitting the multiplexed SRS. When the selected antenna starts transmitting the multiplexed SRS, an in-device antenna coupling characterization is also performed ("ON"). In some implementations, a duration of the in-device antenna coupling characterization of a pair of coupled antennas is shorter than the transmission of the multiplexed SRS by the transmitting antenna, such that the computation is finished ("OFF") before the $2^{nd}$ CP prepended to the guard period begins. The in-device antenna coupling characterization for another pair of coupled antennas (or for the same pair) begins with a transmission of a subsequent multiplexed SRS. For example, a first SRS transmission over OFDM symbols in a first slot 206 may be used to determine the coupling between a first pair of antennas, a second SRS transmission in a second slot 206 may be used to determine the coupling between a second pair of antennas, and so on. In some examples, the first pair of antennas and the second pair of antennas may share a common antenna.

The four slots 206 shown in FIG. 2 are for illustrative purpose and not limiting. The number of SRS transmissions used for the in-device antenna coupling characterization may be greater or fewer than four SRS transmissions in sequence depending on the number of antennas that need detuning in a UE 115. Further, the multiplexed SRS transmission sequence and corresponding in-device antenna coupling characterization may be repeated over time depending upon the desired in-device antenna coupling characterization updating or refreshing. The repeated SRS transmissions also allows the UE 115 to collect optimum detuning settings for the same antenna multiple times at different repeated slots 206 and average the values to provide an improved detuning. Among the slots 206, the multiplexed SRS may be identical for the various antennas. Alternatively, the multiplexed SRS may be unique for each antenna, such that the base station 105 is able to identify which antenna is transmitting the respective received SRS. In-device antenna coupling characterization may be performed in sequential time slots, as illustrated, or may be performed in discontinuous or only in certain selected time slots (for example, based on a determination that it would be beneficial to update one or more parameters between a certain pair of antennas). Some example UE architectures for in-device antenna coupling characterization will now be discussed in more detail.

Figure 3A:
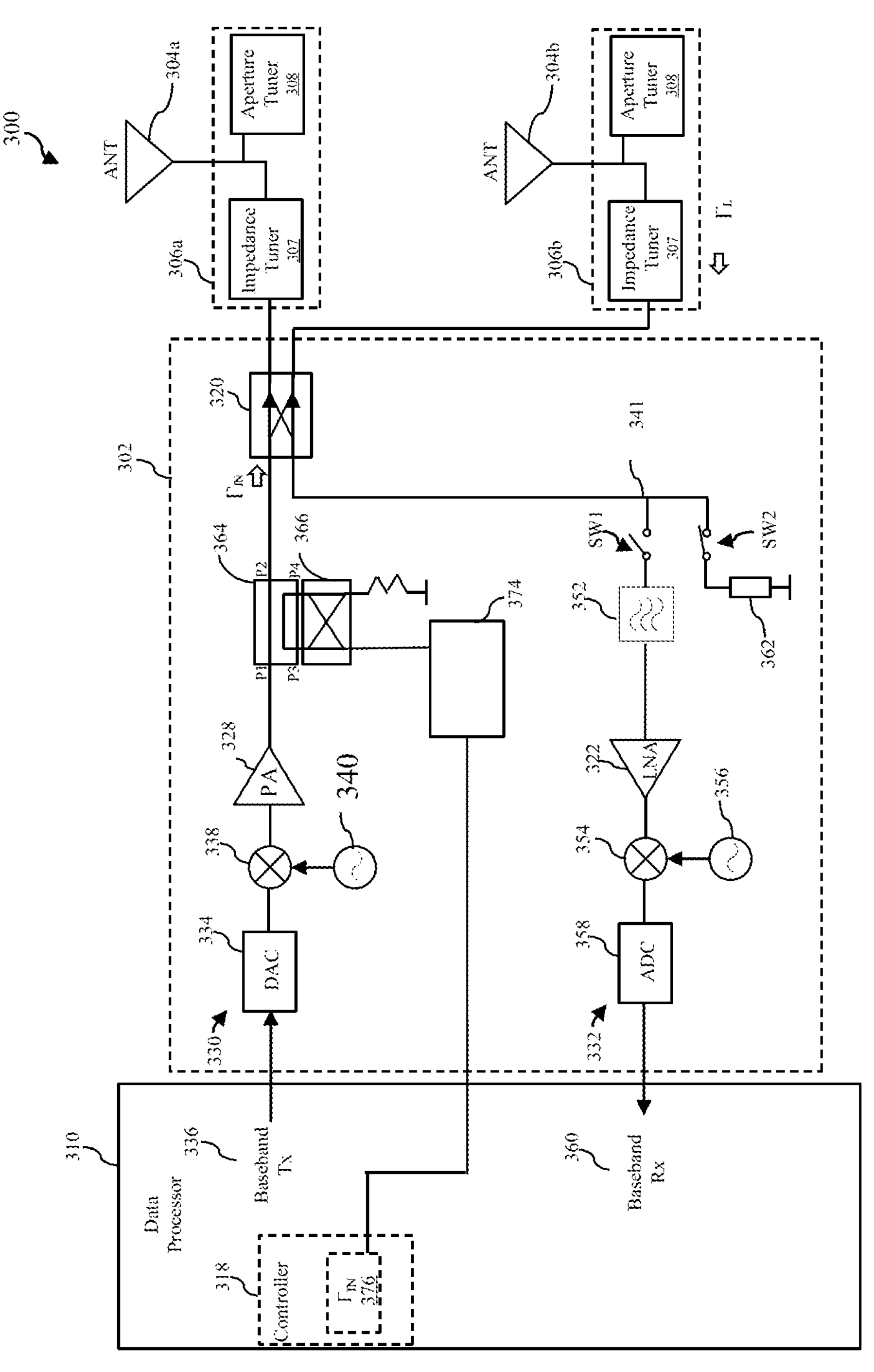
FIG. 3A is a diagram of a user equipment that supports an antenna-tuner-based in-device antenna coupling characterization in accordance with aspects of the present disclosure.

Example UE Architecture for an Antenna-Tuner-Based in-Device Antenna Coupling Characterization As discussed earlier, an antenna-tuner-based in-device characterization of the coupling between a first antenna and a second antenna involves the transmission of a signal through the first antenna while an antenna tuner coupled to the second antenna in the array is sequentially set to different impedances or loads. An example UE 300 with antenna-tuner-based in-device characterization of antenna coupling is shown in FIG. 3A. A transceiver 302 includes a transmitter 330 and a receiver 332 and a data processor 310 (which may be implemented as a modem in some configurations). Transmitter 330 includes a transmit path or chain that begins at a digital-to-analog converter (DAC) 334 for converting a baseband digital transmit (TX) signal 336 to a baseband analog output signal. One or more upconverter mixers 338 in the transmit chain mix the baseband analog output signal with an RF carrier(s) generated from a local oscillator (LO) generator(s) 340 to convert the baseband analog output signal to a modulated RF signal. A power amplifier 328 in the transmit chain amplifies the modulated RF signal and sends the amplified modulated RF signal to an antenna switch array 320.

As discussed earlier, the antenna switch array 320 may be configured into a through configuration or into a cross configuration. In the through configuration, the transmit chain passes through antenna switch array 320 to an antenna tuner 306*a* for a first antenna 304*a*. In the cross configuration, the transmit chain passes through antenna switch array to an antenna tuner 306*b* for a second antenna 304*b*. Additional antennas (not illustrated) may be selectively coupled to the transmit chain (and/or a receive chain, discussed below) through the antenna switch array 320. The antenna switch array 320 may be included in a single circuit (e.g., IC) or components thereof may be distributed across several circuits or across a board or substrate.

In the through configuration, a receive chain couples a received RF signal from second antenna 304*b* through antenna tuner 306*b* and through antenna switch array 320 to a receiver node 341. A switch SW1 couples between receiver node 341 and a receiver 332. In addition, a switch SW2 couples between receiver node 341 and a matched load 362 (e.g., 50Ω). In some examples, the switches SW1 and SW2 are included in an antenna switch module (ASM). During the antenna-tuner-based in-device characterization, switch SW1 may be opened whereas switch SW2 is closed to couple the receive path to the matched load 362. During normal operation in which the in-device characterization is not active, switch SW1 is closed and switch SW2 opened to couple the received RF signal to a filter 352 (e.g., a bandpass filter) in receiver 332. A low-noise amplifier (LNA) 322 in the receive chain amplifies a filtered received RF signal from filter 352. One or more downconverter mixers 354 in the receive chain mix an amplified RF signal from the LNA 322 with an RF carrier(s) generated by an LO generator(s) 356 to convert the amplified RF signal to a baseband analog signal. The receive chain ends at an analog-to-digital converter (ADC) 358 that converts the baseband analog signal to a baseband receive (Rx) digital signal 360.

Antenna tuners 306*a* and 306*b* may each be formed by an impedance tuner 307 and/or an antenna aperture tuner 308. The following discussion will assume that the antenna-tuner-based in-device characterization is performed with antenna switch array 320 in the through configuration, but it will be appreciated that the cross configuration could also have been used. Transmitter 330 may then drive an RF signal into the first antenna 304*a* while its antenna tuner 306*a* is tuned for good power transfer (e.g, a voltage standing wave ratio (VSWR) of 2 or less). A controller 318 in data processor 310 controls antenna switch array 320, antenna tuners 306*a* and 306*b*, and the switches SW1 and SW2 during the antenna-tuner-based in-device characterization.

To measure a reflection coefficient while the antenna-tuner-based in-device characterization is active, UE 300 includes a directional coupler 364 coupled to a portion of the transmit path power amplifier 328 and antenna switch array 320. Directional coupler 364 samples a forward signal (the RF signal for transmission) propagating from power amplifier 328 to antenna 304*a* and also samples a reflected signal that reflects from antenna 304*a* back to power amplifier 328. A signal detector 374 detects the forward and reflected signals so that controller 318 may determine a ratio of the reflected signal to the forward signal to form an input reflection coefficient 376. This reflection coefficient may also be denoted as FIN. In one implementation, directional coupler 364 may sample both the amplitude and phase of the forward and reflected signals such that FIN is a complex number. In other implementations, directional coupler 364 may sample only the magnitudes of the forward and reflected signals such that FIN is a real number. A smaller input reflection coefficient translates to a better matching for the transmitting antenna. For example, $\Gamma_{IN}=0$ implies no reflected power.

The directional coupler 364 may receive the forward RF signal at a first port P1, provide an output RF signal at a second port P2, and provide the sample of the forward signal at a third port P3. The directional coupler 364 may also provide a sample of the reflected RF signal at a fourth port P4. The signal detector 374 may be a square-law power detector, a phase and amplitude signal detector, or another suitable type of signal detector. In some implementations, detector 374 forms a feedback receive path that down converts and digitizes the sampled signal from directional coupler 364 to baseband. In this fashion, the detector 374 may receive RF signals at different ports of directional coupler 364 and may measure the voltage, current, power, and/or other characteristics of the RF signals. Detector 374 may couple to the third and fourth ports through a switch 366. The detector 374 may measure the forward signal propagating to antenna switch array 320 or the reflected signal from antenna switch array 320 based upon a state of the switch 366. The switch 366 may be a "2" pole "2" throw (DPDT) switch. In one state, the switch 366 connects the antenna side of the coupler 364 to a terminating impedance (e.g., a 50Ω load) and the amplifier side of directional coupler 364 to the detector 374. In another state, the switch 366 connects the antenna side of directional coupler 364 to the detector 374 and the amplifier side of directional coupler 364 to the terminating impedance.

By using one directional coupler 364 in conjunction with the switch 366, a single directional coupler may be used in place of two directional couplers to perform signal measurements on a transmission line as described herein, but other configurations may be implemented. The switch 366 changes the connections on the directional coupler 364 in the illustrated example allowing for measurements in either direction, i.e., measurements of signals from the PA 328 and measurements of signals reflected back from the transmitting one of the antennas such as during the transmission of an SRS or other suitable signal.

During the transmission from the first antenna 304*a*, when the switch 366 is set in a first state, the directional coupler 364 develops a voltage $V_f$ indicative of the forward signal. When the switch 366 is set in a second state, the directional coupler 364 develops a voltage $V_r$ indicative of the reflected signal. More specifically, a voltage $V_f$, which is indicative of the forward signal, is measured when the switch 366 is configured such that fourth port P4 of the directional coupler 364 couples to a terminating impedance and third port P3 of the directional coupler 364 feeds into the detector 374. As power is a function of voltage and current, the voltage $V_f$ is proportional to the forward power. Conversely, the voltage $V_r$, indicative of the reflected signal, is measured when the switch 366 is configured such that the fourth port P4 of the directional coupler 364 is connected to the detector 374 and the third port P3 of the directional coupler 364 couples to the terminating impedance. The voltage $V_r$ is proportional to the reverse power.

After determining the voltage $V_f$ and the voltage $V_r$, the ratio $V_r/V_f$ may be determined. As described herein, a single directional coupler may be used to generate voltages $V_r$ and $V_f$. The voltages $V_r$ and $V_f$ are proportional to the forward power and reflected power, respectively. A ratio $V_r/V_f$ defines the input reflection coefficient FIN as in the following Equation (1):

$$\Gamma_{IN}=V_r/V_f \quad \text{Equation (1)}$$

Input reflection coefficient $\Gamma_{IN}$ may be used to determine other figure of merits describing an RF channel, such as the voltage standing wave ratio (VSWR). The VSWR is given by the following Equation (2):

$$\text{VSWR}=(1+|\Gamma_{IN}|)/(1-|\Gamma_{IN}|) \quad \text{Equation (2)}$$

In some implementations, the detector 374 is capable of calculating the input reflection coefficient FIN, and/or other figures of merit (e.g., VSWR), from the measurements of $V_f$ and $V_r$ and report the calculated results to the data processor 310 as controlled by controller 318. Alternately, controller 318 may calculate the input reflection coefficient FIN. In some implementations, the detector 374 includes an analog-to-digital converter (ADC) that digitizes the $V_r$ and $V_f$ measurements and provides their digitized values. The digitized values of the voltages $V_r$ and $V_f$ may be transmitted to the data processor 310. Circuitry within the data processor 310 may store the information so that the input reflection coefficient FIN, and/or other figures of merit may be calculated.

Smaller values of FIN indicate less reflection and a better match between the antenna and the radio (or the antenna and the transmission line). As may be determined from Equation (1) above, the lowest possible value for the input reflection coefficient is 0. When the input reflection coefficient is 0 no reflections are occurring, i.e., the antenna and the radio or the antenna and the transmission medium are perfectly matched. No power is being reflected when FIN is 0. As reflections at an interface increase, FIN increases. Antenna tuner 306*a* may be tuned accordingly by controller 318 to lower the input reflection coefficient. Using both the magnitude and phase components of FIN may improve the tuning process.

However, minimizing FIN may not directly translate to maximizing the total radiated power from antenna 304*a* because transmitted power may be coupled to other antennas and dissipated in circuits such as LNA 322 instead of radiating into free space. Accordingly, to better detune the coupled antennas, acquiring input reflection coefficient FIN alone may not be sufficient. The antenna-tuner-based in-device characterization disclosed herein advantageously determines the scattering parameters between a transmitting antenna and a coupled receive antenna so that the detuning of the coupled receive antenna may be improved.

The computations by data processor 310 of the scattering parameters from the input reflection coefficient FIN will now be discussed in more detail. To compute the scattering parameters, controller 316 sets the antenna tuner 306*b* for antenna 304*b* to a first impedance value and a first measurement of the input reflection coefficient is performed with the antenna switch array 320 is in the through configuration and while the switch SW2 is on and switch SW1 is off. With the switches maintained in the same configurations, the antenna tuner 306*b* is set to a second impedance value and a second measurement of the input reflection coefficient is performed. Finally, the antenna tuner 306*b* is set to a third impedance value and a third measurement of the input reflection coefficient is performed with the switches maintained in the same configurations. From these three measurements, data processor 310 computes the scattering parameters $S_{11}$, $S_{22}$, $S_{21}$, and $S_{22}$. These measurements may be performed sequentially using separate reference signals. Alternatively, if a reference signal transmission duration is sufficient, all the measurements may be performed during a single reference signal transmission. With respect to this computation, the impedance of the antenna tuner 306*b* determines a load reflection coefficient $\Gamma_L$, which is a function of an impedance of antenna tuner 306*b* and a characteristic impedance. The impedance of the antenna tuner 306*b* may thus be converted by data processor 310 into the load reflection coefficient. The computation of the scattering parameters may then be based upon the relationship between the input reflection coefficient $\Gamma_{IN}$ and the load reflection coefficient $\Gamma_L$ as given by the following Equation (3):

$$\Gamma_{IN} = S_{11} + \frac{S_{12}S_{21}\Gamma_L}{1 - S_{22}\Gamma_L} \quad \text{Equation (3)}$$

The S-parameters $S_{11}$, $S_{22}$, and the product $S_{11}*S_{21}$ describe the two-port channel between the TX antenna 304*a* and the RX antenna 304*a*. To simplify the notation, the input reflection coefficient $\Gamma_{IN}$ may also be denoted as M (a shorthand for a measurement of the input reflection coefficient), and the load reflection coefficient $\Gamma_L$ is denoted as L. Thus, Equation (3) yields the following Equation (4):

$$M=S_{11}+MLS_{22}+L(S_{12}S_{21}-S_{11}S_{22}) \quad \text{Equation (4)}$$

Controller 318 may thus calculate a first input reflection coefficient measurement M1 with antenna tuner 306*b* configured to provide a first load reflection coefficient L1. Similarly, a second measurement M2 is measured using a second load reflection coefficient L2. Finally, a third measurement M3 is measured using a third load reflection coefficient L3. From the values M1, M2, M3, L1, L2, and L3, controller 318 may solve for corresponding three versions of equation (4) to determine the three unknowns $S_{11}$, $S_{22}$, and $S_{12}*S_{21}$. The scattering coefficient $S_{21}$ (or $S_{12}$) may then be determined from a square root of ($S_{12}*S_{21}$).

These three versions of Equation (4) can be written in matrix form as shown in the following Equation (5):

$$\begin{bmatrix} 1 & M_1L_1 & L_1 \\ 1 & M_2L_2 & L_2 \\ 1 & M_3L_3 & L_3 \end{bmatrix} \cdot \begin{bmatrix} S_{11} \\ S_{12} \\ \Delta \end{bmatrix} = \begin{bmatrix} M_1 \\ M_2 \\ M_3 \end{bmatrix} \quad \text{Equation (5)}$$

in which $\Delta=S_{12}S_{21}-S_{11}S_{22}$.

Accordingly, controller 318 may compute the two-port S-parameters using the method of solving three linear equations having three unknowns. Once the two-port S-parameters are computed, the two-port channel represented by the two-port S-parameters is characterized.

When controller 318 acquires values of M1, M2, and M3 corresponding to loads L1, L2, and L3, it may solve the Equation (5) to get the scattering parameters describing the two-port channel from the transmitting antenna 304*a* to the receiving antenna 304*b*. As the two-port channel is characterized, controller 318 may further compute an optimum load that most effectively detunes antenna 304*b*. In addition to detuning antenna 304*b*, tuner states of antenna tuners 306*a* and 306*b* may be adjusted to avoid instability as an alternative to iterative control of antenna tuners 306*a* and 306*b* with a relatively large hysteresis. In addition, the characterization of the scattering parameters may be used by controller 318 for dynamic control of filters such as filter 352 and for dynamic control of the biasing of power amplifiers 328 and low-noise amplifier 322. At a conclusion of the characterization mode prior to the operation mode, detuning controller 318 may set the antenna tuner 306*b* to the optimum load or to a value in the tunable range that is closest to the optimum load. The coupling between antennas 304*a* and 304*b* is thus advantageously minimized or reduced such that the total radiated power from UE 300 as antenna 304*a* transmits during the operation mode is increased or maximized.

The antenna-tuner-based in-device characterization may be repeated with antenna switch array 320 in the cross configuration such that it is antenna 304*b* transmitting and antenna 304*b* receiving. Antenna tuner 306*b* would be set for good power transfer (e.g., a VSWR of 2 or less) whereas it is antenna tuner 306*a* that is cycled through three different load settings while the corresponding input reflection coefficients are determined by controller 318. Controller 318 may then average the calculation of the scattering parameter $S_{21}$ with the antenna switch array 320 in the through configuration with the calculation of $S_{21}$ with the antenna switch array 320 in the cross configuration.

Figure 3B:
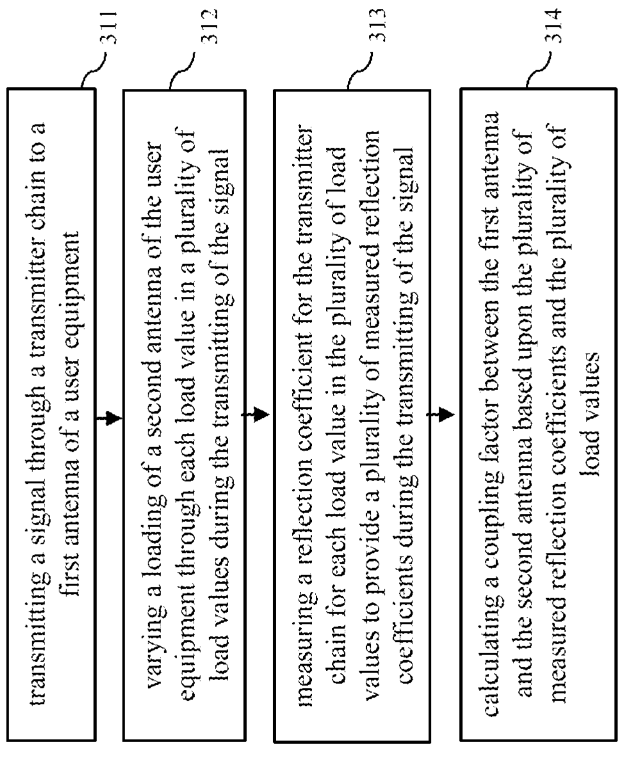
FIG. 3B is a flowchart for a method of operation of the user equipment of FIG. 3A.

Examples of the antenna-tuner-based in-device characterization of the antenna coupling will now be described with respect to the flowchart of FIG. 3B. The method begins with an act 311 of transmitting a signal through a transmitter chain to a first antenna of a user equipment. The transmission of a signal such as an SRS through the transmit chain of UE 300 with the antenna switch array 320 in either the through or cross configuration is an example of act 311. The method also includes an act 312 of varying a loading of a second antenna of the user equipment through each load value in a plurality of load values during the transmitting of the signal. Should act 311 occur in the through configuration, an example of act 312 is the setting of antenna tuner 306b to one of three different load values. Should act 311 occur in the cross configuration, an example of act 312 is the setting of antenna tuner 306a to the three different load values. The method also includes an act 313 of measuring a reflection coefficient of the transmitter chain for each load value in the plurality of load values to provide a plurality of measured reflection coefficients during the transmitting of the signal. The measurement of the reflection coefficients at directional coupler 364 is an example of act 313. Finally, the method includes an act 314 of calculating a coupling factor between the first antenna and the second antenna based upon the plurality of measured reflection coefficients and the plurality of load values. The solving by the controller 318 of Equation (5) for either the through or cross configuration is an example of act 314. While the use of three known loads is described with respect to certain examples above in order to compute a certain set of scattering parameters, a greater (e.g., when in a configuration with more than two ports and/or more than three unknown scattering parameters) or fewer (e.g., when certain parameters are already known or characterized through another method or procedure) number of known loads may be implemented and/or utilized.

The accuracy and precision of the scattering parameter characterization using the antenna-tuner-based technique is affected by the impedances and losses of components such as antenna tuners 306a and 306b. But directly measuring the antenna scattering parameters requires the soldering of test cables to the ports for antennas 304a and 304b as discussed earlier. The use of the tuner open, short, and load calibration allows the UE to de-embed the effects of intervening components such as antenna tuners in the calibration-path-based in-device characterization while the forward and reflected signals are sampled at the directional coupler. The calibration-path-based in-device characterization thus provides the accuracy of the test cable approach without the need for the invasive and expensive approach of soldering the test cables and then detaching them. An example UE architecture for the calibration-path-based in-device characterization will now be discussed.

Figure 4A:
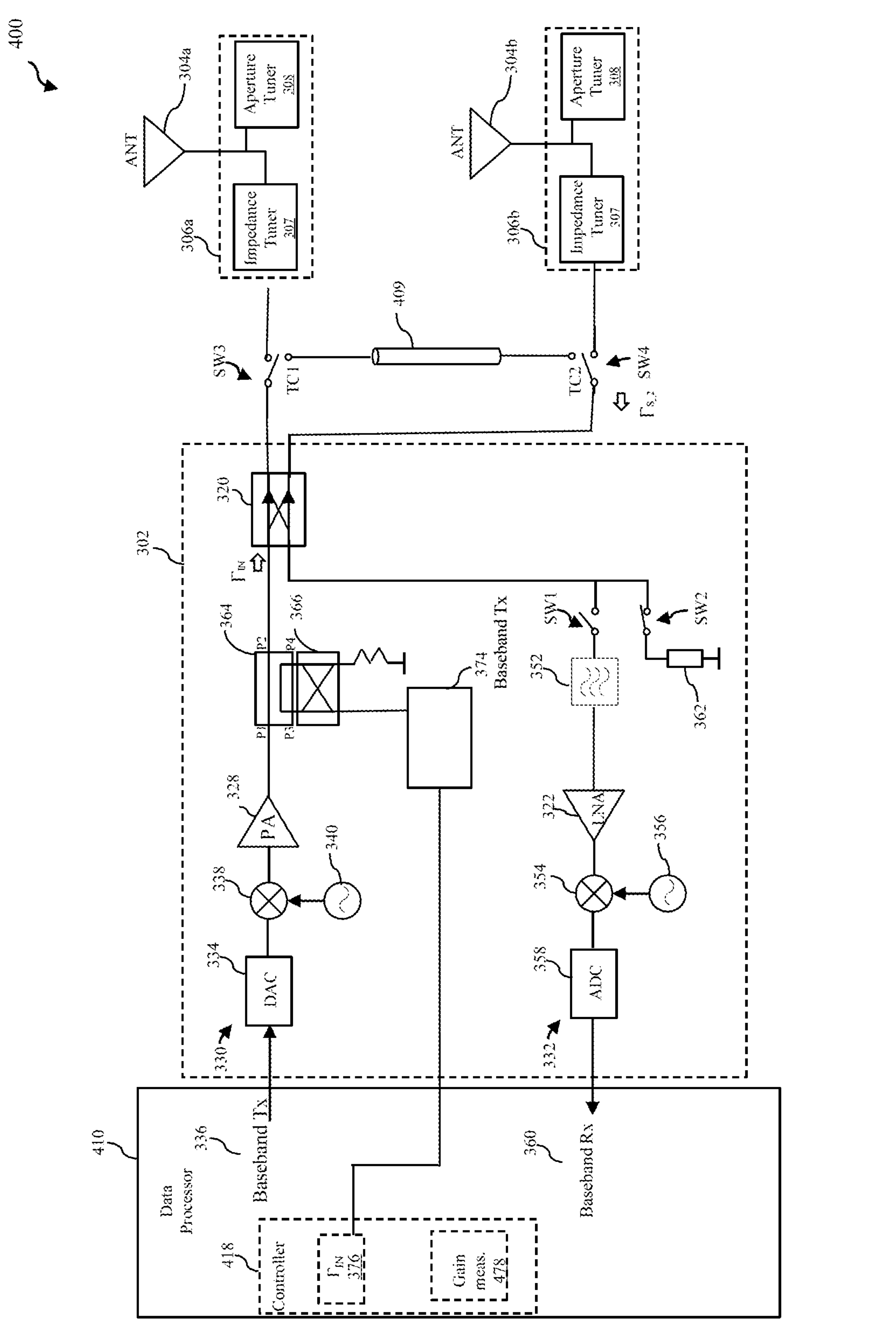
FIG. 4A is a diagram of a user equipment that supports a calibration-path-based in-device antenna coupling characterization in accordance with aspects of the present disclosure.

Example UE Architecture for a Calibration-Path-Based in-Device Antenna Coupling Characterization An example UE 400 with calibration-path-based in-device characterization is shown in FIG. 4A. Transceiver 302, antennas 304a and 304b, and antenna tuners 306a and 306b are as discussed for UE 300. A data processor 410 generates a baseband digital transmit (Tx) signal 336 for the transmit chain in transceiver 302 as discussed for data processor 310. Similarly, data processor 410 receives a baseband digital receive (Rx) signal 360 from the receive chain in transceiver 302.

To de-embed the effects of the antenna tuners 306a and 306b on the scattering parameter characterization, a selectable calibration path (e.g., a transmission line) 409 may selectively couple between the transmit and receive ports of antenna switch array 320. Calibration path 409 has a characteristic impedance (e.g., 50Ω) that matches the desired characteristic impedance of the transmit and receive paths in transceiver 302. A pair of RF switches SW3 and SW4 are configurable to select for calibration path 409. The switches SW3 and SW4 may be "1" pole "2" throw (1P2T) switches. The calibration path 409 may comprise any suitable transmission line such as a microstrip line or a stripline. The switch SW3 is located between a first port TC1 of antenna switch array 320 and the antenna tuner 306a whereas switch SW4 is located between a second port TC2 of antenna switch array 320 and the antenna tuner 306b. Each of the switches SW3 and SW4 may be implemented with transistors (e.g., NFETs or PFETs) such as to form transmission gates or other suitable implementations. Switches SW3 and SW4 may be part of RF test connectors with built-in break/make contacts in some implementations. In the through configuration of antenna switch array 320, port TC1 is a transmit port whereas port TC2 is a receive port. In the cross configuration, port TC1 is the receive port whereas port TC2 is the transmit port.

The calibration-path-based characterization performed by UE 400 includes a gain measurement mode and a reflection coefficient measurement mode. In both modes, the switch SW1 is closed whereas the switch SW2 is open. In the gain measurement mode, a controller 418 such as implemented by data processor 410 performs a gain measurement 478 through a ratio of the received baseband digital signal to the transmitted baseband digital signal. This gain is measured twice: a first gain measurement with calibration path 409 coupled to ports TC1 and TC2 (antennas 304a and 304b thus being isolated) and a second gain measurement with calibration path 409 isolated from ports TC1 and TC2. This first gain is denoted herein as a gain $G_{v\_CAL}$. During the second gain measurement, antenna tuners 306a and 306b are tuned for good power transfer (relatively low VSWR). The second gain is deemed herein as a gain $G_{v\_CANT}$. In the second gain measurement, antenna switch array 320 can be in either the through or cross configuration. The following discussion will assume that the through configuration is used during the gain measurements without loss of generality. In the through configuration during the second gain measurement, port TC1 couples to antenna 304a through switch SW3 and antenna tuner 306a whereas port TC2 couples to antenna 304b through switch SW4 and antenna tuner 306b.

In the reflection coefficient mode measurement, controller 418 controls switches SW3 and SW4 to isolate the calibration path 409 from ports TC1 and TC2. Antennas 304a and 304b are then coupled through respective switches SW3 and SW4 to respective ones of ports TC1 and TC2. Controller 418 then measures the input reflection coefficient 376 as sampled through directional coupler 364, switches 366, and signal detector 374 analogously as discussed for UE 300. Controller 418 controls the antenna switch array 320 so that a first reflection coefficient is measured with antenna switch array 320 in the through configuration and so that a second reflection coefficient is measured with antenna switch array 320 in the cross configuration. In the cross configuration, port TC1 couples to antenna 304b through antenna tuner 306b while port TC2 couples to antenna 304a through antenna tuner 306a.

By combining the gain measurements from the gain measurement mode and the reflection coefficient measurements from the reflection coefficient measurement mode, controller 418 may compute the $S_{21\_CANT}$ scattering parameter describing the coupling between antenna 304a and 304b as given by the following Equation (6):

$$S_{21\_CANT} = \frac{G_{v\_CANT}}{G_{v\_CAL}} \cdot S_{21\_CAL}. \qquad \text{Equation (6)}$$

-continued $$\frac{1 - S_{22\_IT1}\Gamma_{IN\_CANT\_1}}{S_{21\_IT1}} \cdot \frac{1 - S_{22\_CANT}S_{22\_IT2}}{S_{21\_IT2}}$$

in which $S_{21\_CAL}$ is the scattering parameter describing the coupling between the two input/output ports to calibration path 409;

$$\frac{1 - S_{22\_IT1}\Gamma_{IN\_CANT\_1}}{S_{21\_IT1}}$$

represents the de-embedding of antenna tuner 306*a* in which $S_{22\_IT1}$ and $S_{21\_IT1}$ are scattering parameters for antenna tuner 306*a* such as obtained from an open-short-load characterization, $\Gamma_{IN\_CANT\_1}$ is obtained by the $\Gamma$ measurement with the antenna switch array 320 in the through configuration;

$$\frac{1 - S_{22\_CANT}S_{22\_IT2}}{S_{21\_IT2}}$$

represents the de-embedding of antenna tuner 306*b* in which $S_{22\_IT2}$ and $S_{21\_IT2}$ are scattering parameters for antenna tuner 306*b* (e.g., from an open-short-load characterization), and $S_{22\_CANT}$ is obtained by the $\Gamma$ measurement with the antenna switch array 320 in the cross configuration.

It will be appreciated that calibration path need not couple between ports TC1 and TC2 but instead could couple between the transmit and receive paths of transceiver 302 upstream of antenna switch array 320 (i.e., on the data processor 410 side of antenna switch array 320). However, note that increased accuracy may be obtained by placing calibration path 409 closer to antenna tuners 306*a* and 306*b* as opposed to being more upstream in transceiver 302.

Figure 4B:
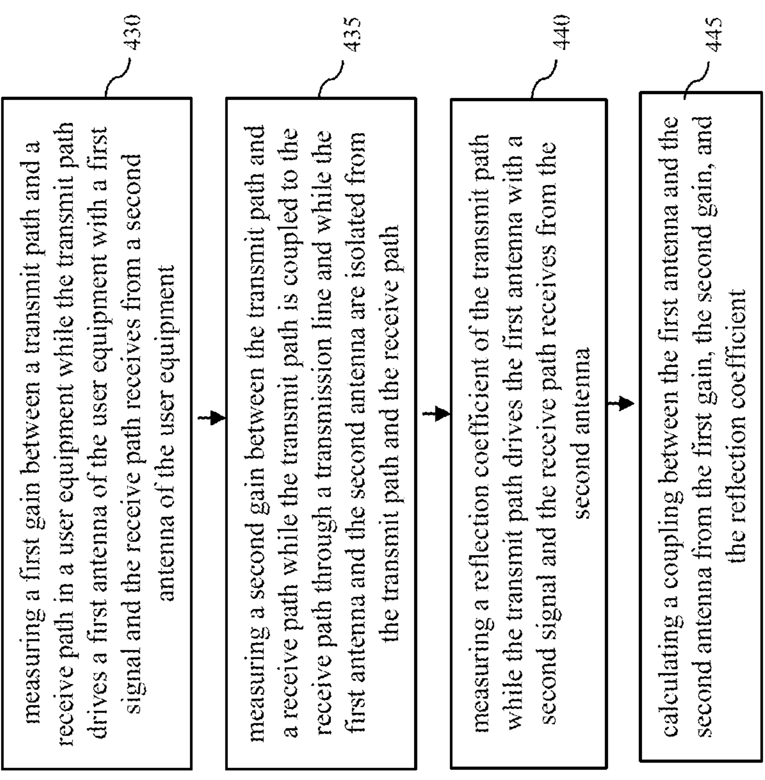
FIG. 4B is a flowchart for a method of operation of the user equipment of FIG. 4A.

Examples of the calibration-path-based characterization of the scattering parameters by UE 400 will now be described with respect to the flowchart of FIG. 4B. The method includes an act 430 of measuring a first gain between a transmit path and a receive path in a user equipment while the transmit path drives a first antenna of the user equipment with a first reference signal (e.g., an SRS) and the receive path receives from a second antenna of the user equipment. The determination of the gain $G_{v\_CANT}$ is an example of act 430. The method also includes an act 435 of measuring a second gain between the transmit path and a receive path while the transmit path is coupled to the receive path through a transmission line and while the first antenna and the second antenna are isolated from the transmit path and the receive path. The determination of $G_{v\_CAL}$ is an example of act 435. In addition, the method includes an act 440 of measuring a reflection coefficient of the transmit path while the transmit path drives the first antenna with a second signal and the receive path receives from the second antenna. The determination of the input reflection coefficient with the antenna switch array 320 in either the through or cross configuration is an example of act 440. Finally, the method includes an act 445 of calculating a coupling between the first antenna and the second antenna from the first gain, the second gain, and the reflection coefficient. The calculation at controller 418 of $S_{21\_CANT}$ using Equation (6) is an example of act 445.

The inclusion of calibration path 409 is advantageous with respect to increasing the fidelity of the antenna coupling characterization but may add an additional component (temporarily or permanently) to the UE architecture. No calibration path between the transmit and receive chains is needed in the calibration-gain-based in-device characterization. An example UE architecture for the calibration-gain-based technique will now be discussed.

Figure 5A:
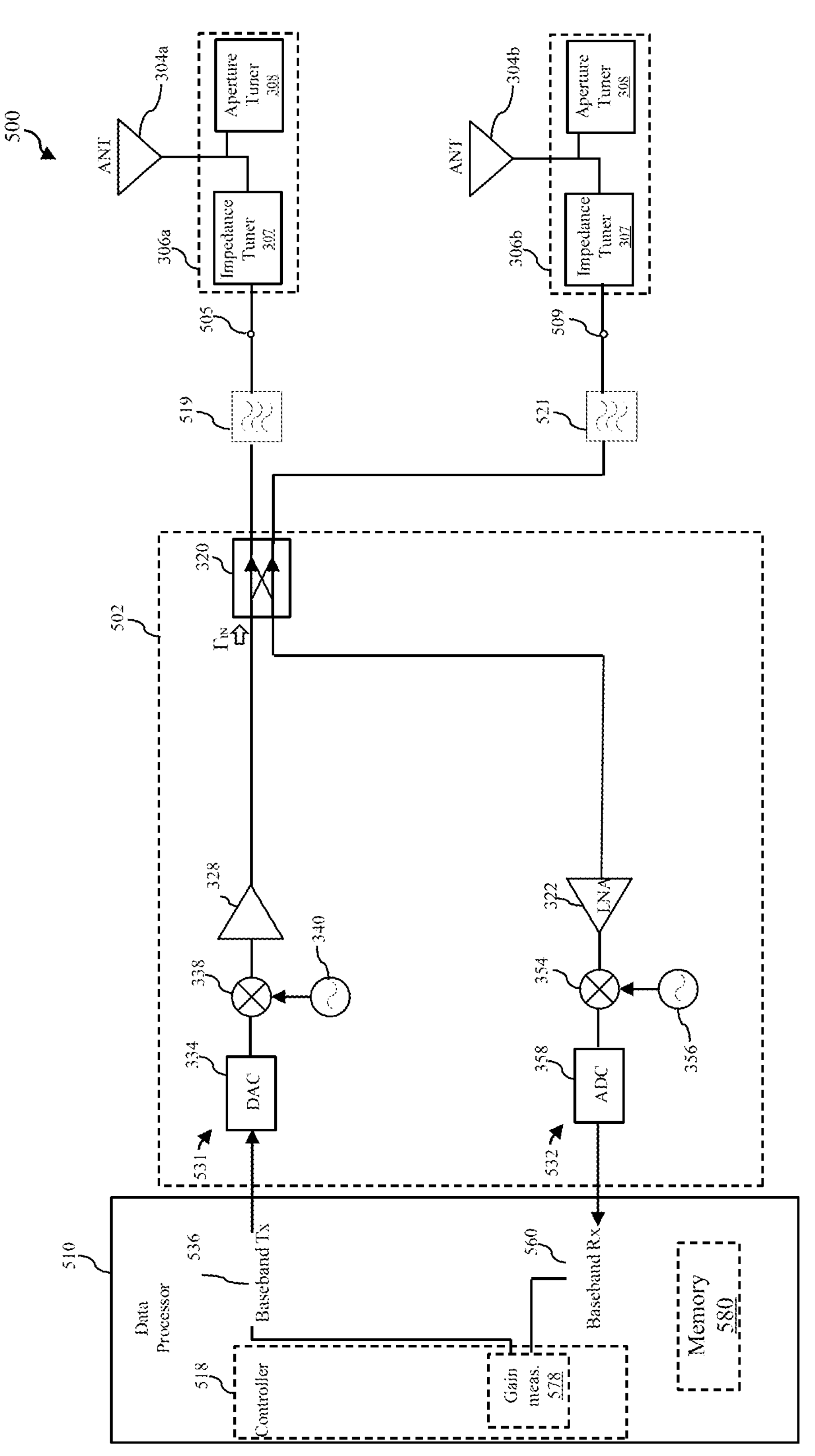
FIG. 5A is a diagram of a user equipment that supports a calibration-gain-based in-device antenna coupling characterization in accordance with aspects of the present disclosure.

Example UE Architectures for a Calibration-Gain-Based in-Device Antenna Coupling Characterization An example UE 500 with calibration-gain-based in-device characterization of antenna coupling is shown in FIG. 5A. A transceiver 502 includes a transmitter 531 that includes a transmit chain including a DAC 334, one or more mixers 338, local oscillator(s) 340, and power amplifier 328 arranged as discussed for transmitter 330 of UE 300. Similarly, transceiver 502 includes a receiver 532 that includes a receive chain including an ADC 358, one or more mixers 354, local oscillator(s) 356, and LNA 322 arranged as discussed for receiver 332 of UE 300. UE 500 also includes a data processor 510 including a controller 518 for controlling the calibration-gain-based in-device characterization of the antenna coupling.

The transmit chain extends through power amplifier 328 to the antenna array switch 320 having the through and cross configurations discussed with regard to UEs 300 and 400. In the through configuration, the transmit chain couples from power amplifier 328 through antenna switch array 320 and through a bandpass filter 519 to drive antenna tuner 306*a* and antenna 304*a*. In the through configuration, the receive chain couples from antenna 304*b* through antenna tuner 306*b*, a bandpass filter 521, antenna switch array 320 to drive LNA 322. Bandpass filter 519 couples to antenna tuner 306*a* through a test port 505. Similarly, bandpass filter 521 couples to antenna tuner 306*b* through a test port 509.

In some implementations, test ports 505 and 509 are probe pads on a printed circuit board or antenna module including antenna tuners 306*a* and 306*b*. During the manufacture of UE 500, an external tester couples through a testing probe to test port 505. With the antenna switch array 320 in the through configuration, the external tester applies a matched load (e.g., 50Ω) at test port 505 and measures the transmit chain gain. For example, data processor 510 may be configured into a test mode in which the amplitude of the baseband TX signal is known. Alternatively, data processor 510 may report this signal amplitude to the external tester so that the external tester may determine the transmit chain gain. In some instances, the port 505 is a probe pad at a PCB board. The external tester may be a power meter or a voltage meter. The external tester measures a calibration transmit gain denoted herein as $G_{TxCAL}$ between a baseband Tx signal 536 and a signal detected by the external tester at the test port 505.

The external tester may also measure a calibration receive gain denoted herein as $G_{RxCAL}$ between a signal provided to test port 509 and the baseband Rx signal 560. Data processor 510 may report the amplitude of the baseband Rx signal 560 to the external tester so that the external tester may determine the calibration receive gain. These calibration gain measurements may then be stored in a memory 580 of data processor 510. During the calibration gain measurements, the antennas 304*a* and 304*b* along with antenna tuners 306*a* and 306*b* are disconnected from the transmit and receive paths. Ports 505 and 509 may thus be RF test connectors that have a built-in break/make contact in some implementations.

During a subsequent operation of UE 500 following manufacture, controller 518 may estimate the antenna coupling between antennas 304*a* and 304*b* by performing a gain measurement 578 defined by a ratio $G_v$ [dB] of the baseband Rx signal 560 to the baseband Tx signal 536. Alternatively, gain measurement 578 may also be performed at the manufacture of UE 500. Controller 518 may then estimate the antenna coupling such as through the following Equation (7):

$$C_{TxRx}\,[\text{dB}]=G_v\,[\text{dB}]-G_{TxCAL}\,[\text{dB}]-G_{RxCAL}\,[\text{dB}] \qquad \text{Equation (7)}$$

in which $G_v$ [dB] is obtained during operation of the UE 500 and $G_{TxCAL}$ and $G_{RxCAL}$ are retrieved from the memory 580 of data processor 510. Such a calibration-gain-based characterization provides an estimate of the magnitude of the antenna coupling (without phase information). Note that the estimate varies as a function of tuner states of the antenna tuners 406*a* and 406*b*.

Figure 5B:
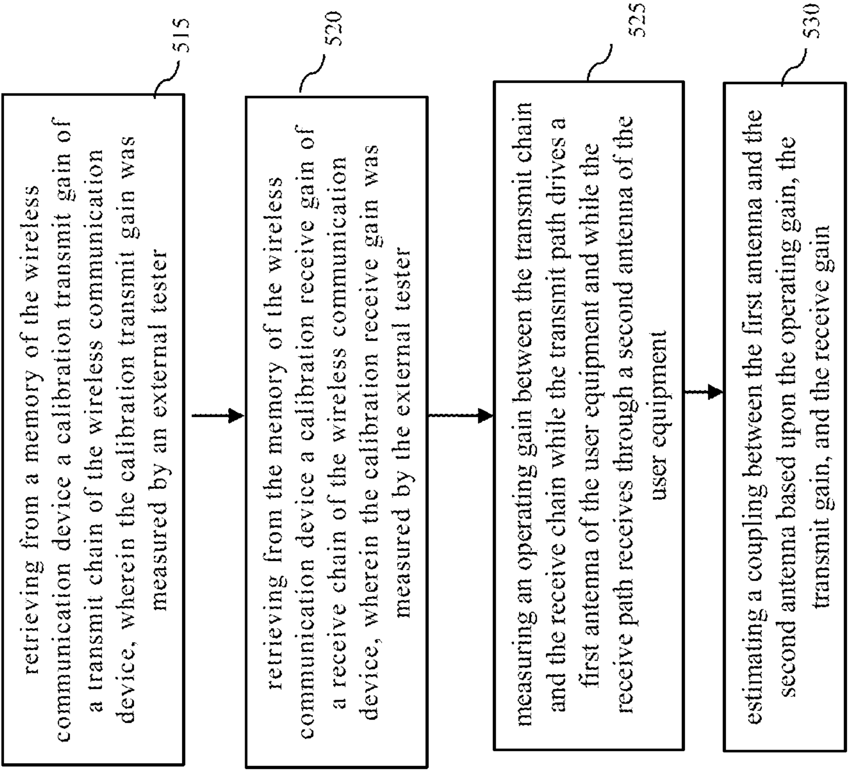
FIG. 5B is a flowchart for a method of operation of the user equipment of FIG. 5A.

Examples of the calibration-gain-based characterization method practiced by a wireless communication device such as UE 500 will now be described with respect to the flowchart of FIG. 5B. The method includes an act 515 of retrieving from a memory of the wireless communication device a calibration transmit gain of a transmit chain of the wireless communication device, wherein the calibration transmit gain was measured by an external tester. The retrieving of the gain $G_{TxCAL}$ from memory 580 as measured at test port 505 is an example of act 515. The method also includes an act 520 of retrieving from a memory of the wireless communication device a calibration receive gain of a receive chain of the wireless communication device, wherein the calibration receive gain was measured by the external tester. The retrieving of the gain $G_{RxCAL}$ in memory 580 as measured at test port 509 is an example of act 520. In addition, the method includes an act 525 of measuring an operating gain between the transmit chain and the receive chain while the transmit path drives a first antenna of the user equipment (e.g., with a reference signal, for example an SRS) and while the receive path receives through a second antenna of the user equipment. The measuring of the gain $G_v$ at controller 518 is an example of act 525. Finally, the method includes an act 530 of estimating a coupling between the first antenna and the second antenna based upon the operating gain, the transmit gain, and the receive gain. The determination of the coupling gain $C_{TxRx}$ by controller 518 using Equation (7) is an example of act 530.

Figure 6A:
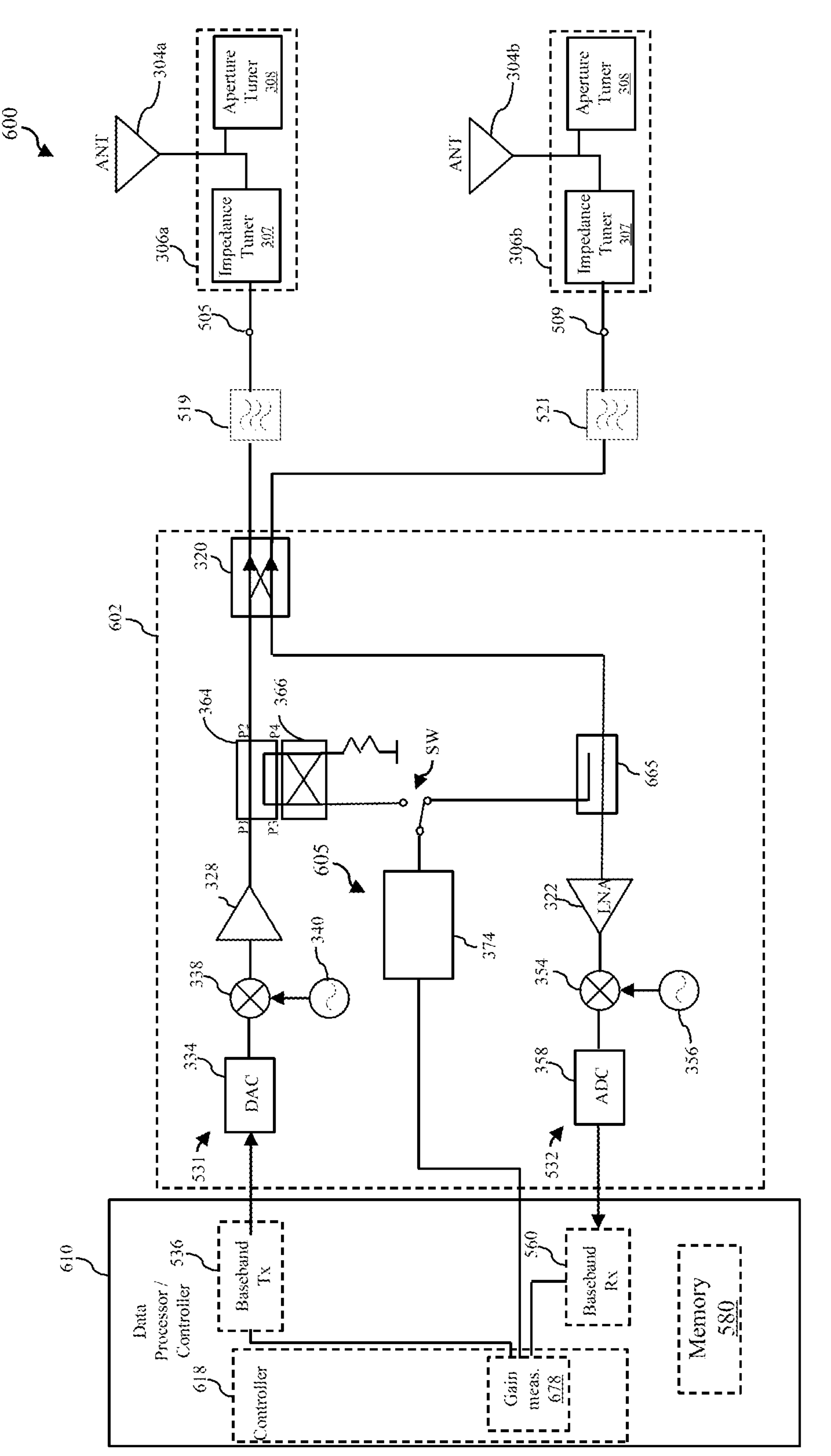
FIG. 6A is a diagram of a user equipment that supports a calibration-gain-based in-device antenna coupling characterization using a feedback receive path in accordance with aspects of the present disclosure.

Note that the use of the receive chain during the characterization of the operating gain $G_v$ [dB] may interfere with time-critical communications. To avoid this usage of the receive chain, a feedback receive chain may be used. An example UE 600 with calibration-gain-based in-device characterization of antenna coupling including a feedback receive chain 605 is shown in FIG. 6A. A transceiver 602 includes a transmitter 531 having a transmit chain including a DAC 334, one or more mixers 338, local oscillator(s) 340, and power amplifier 328 arranged as discussed for UE 500. Similarly, transceiver 602 includes a receiver 532 that includes a receive chain including an ADC 358, one or more mixers 354, local oscillator(s) 356, and LNA 322 arranged as discussed for UE 500. UE 600 also includes a data processor 610 including a controller 618 for controlling the calibration-gain-based in-device characterization of the antenna coupling.

The transmit chain extends through power amplifier 328 to antenna array switch 320 having the through and cross configurations discussed with regard to UE 500. In the through configuration, the transmit chain couples from power amplifier 328 through antenna switch array 320 and through a bandpass filter 519 to drive antenna tuner 306*a* and antenna 304*a*. In the through configuration, the receive chain couples from antenna 304*b* through antenna tuner 306*b*, a bandpass filter 521, and antenna switch array 320 to drive LNA 322. Bandpass filter 519 couples to antenna tuner 306*a* through the test port 505. Similarly, bandpass filter 521 couples to antenna tuner 306*b* through the test port 509.

Feedback receive path 605 may be used during normal operation of UE 600 to measure the gain of power amplifier 328 so that a transmitted signal may have a desired power level. Feedback receive path 605 includes the signal detector 374 discussed with regard to UE 300. In some implementations, signal detector 374 may be a square-law detector. In other implementations, signal detector 374 may include a down-conversion stage such as a mixer as also discussed with regard to UE 300. Signal detector 374 couples to directional coupler 364 through a switch SW and through the switch 366 so that controller 618 may perform a gain measurement 678 of power amplifier 328 during normal operation of UE 600.

During a test calibration mode at manufacture of UE 600, switch SW is configured so that the receive feedback path 605 instead samples a receive signal from the receive path such as sampled by a sampling circuit, e.g., a directional coupler 665. Antennas 304*a* and 304*b* are disconnected from the transmit and receive paths during the test calibration stage. With regard to the test calibration mode, test ports 505 and 509 are probe pads on a printed circuit board or antenna module including antenna tuners 306*a* and 306*b* in some implementations of UE 600. The test calibration mode occurs during the manufacture of UE 600 and involves the use of the external tester that couples to either test port 505 or test port 509. With the antenna switch array 320 in the through configuration, the external tester applies a matched load (e.g., 50Ω) at test port 505 and measures the transmit chain gain. The external tester may be a power meter or a voltage meter. The external tester measures the calibration transmit gain denoted herein as $G_{RxCAL}$ that defines the gain between a baseband Tx signal 565 and the signal detected by the external tester at test port 505. The calibration transmit gain $G_{TxCAL}$ may then be stored in memory 580. To measure the calibration receive gain denoted herein as $G_{RxCAL}$, the external tester couples to test port 509 while switch SW couples the feedback receive chain 605 to directional coupler 665. In this fashion, the external tester may measure the calibration receive gain $G_{RxCAL}$ as defined as the gain between a test signal applied to test port 509 and a detected baseband signal from the feedback receive path 605. The calibration receive gain $G_{RxCAL}$ may then be stored in memory 580.

To measure the antenna coupling during normal operation of UE 600, controller 618 may measure an operating gain $G_v$ [dB] between baseband Tx signal 536 and a detected baseband signal from feedback receive path 605 with the switch SW being configured to couple directional coupler 665 to the feedback receive path 605. With $G_v$ [dB], $G_{TxCAL}$, and $G_{RxCAL}$ all being known, controller 618 may then proceed to determine the antenna coupling $C_{TxRx}$ [dB] as discussed with regard to Eq. (7). In contrast to UE 500, UE 600 may continue to receive over its receive path in normal operation because a sensing circuit such as directional coupler 665 senses only a portion of the received signal. The remainder of the received signal may be amplified by LNA 322, down converted in mixer 354, and digitized in ADC 358 to form the baseband Rx signal 560. Baseband Rx signal 560 may thus be received simultaneously in UE 600 while controller 618 measures gain $G_v$ [dB].

Figure 6B:
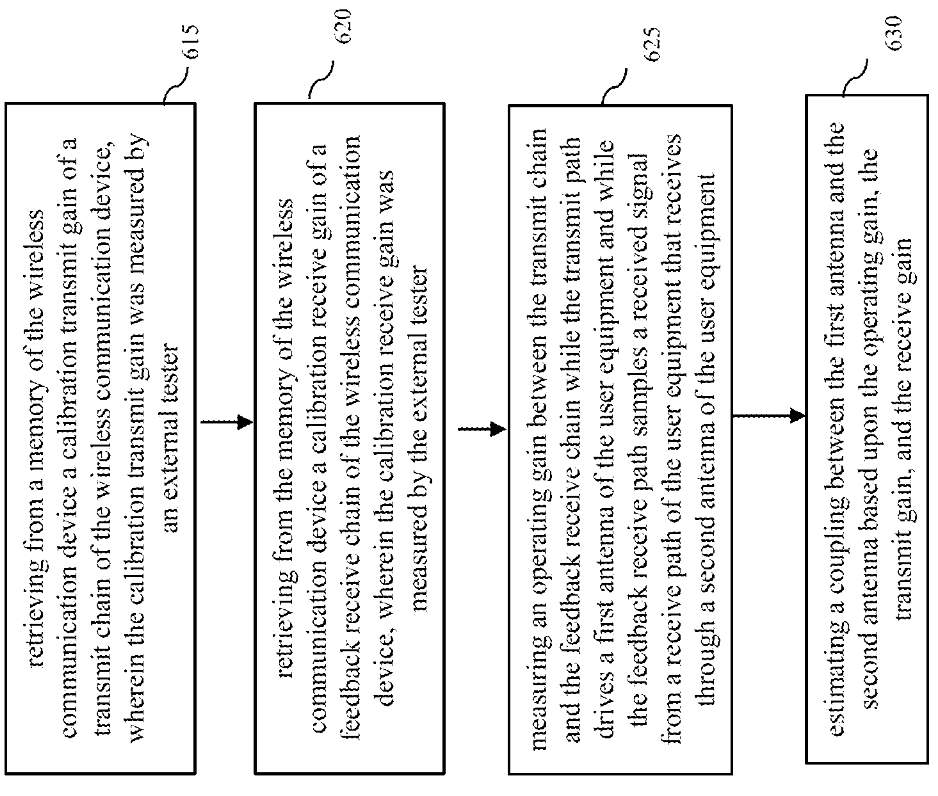
FIG. 6B is a flowchart for a method of operation of the user equipment of FIG. 6A.

Examples of a calibration-gain-based characterization method using a feedback receive path will now be described with respect to the flowchart of FIG. 6B. The method includes an act 615 retrieving from a memory of the wireless communication device a calibration transmit gain of a transmit chain of the wireless communication device, wherein the calibration transmit gain was measured by an external tester. The retrieving of the gain calibration transmit $G_{TxCAL}$ in memory 580 as measured at test port 505 in UE 600 is an example of act 615. The method also includes an act 620 of retrieving from the memory of the wireless communication device a calibration receive gain of a feedback receive chain of the wireless communication device, wherein the calibration receive gain was measured by the external tester. The retrieving of the calibration receive gain $G_{RxCAL}$ in memory 580 as measured at test port 509 in UE 600 is an example of act 620. In addition, the method includes an act 625 of measuring an operating gain between the transmit chain and the feedback receive chain while the transmit path drives (e.g., with a reference signal, for example an SRS) a first antenna of the user equipment and while the feedback receive path samples a received signal from a receive path of the user equipment, wherein the receive path receives the received signal through a second antenna of the user equipment. The measuring of the gain $G_v$ at controller 618 is an example of act 625. Finally, the method includes an act 630 of estimating a coupling between the first antenna and the second antenna based upon the operating gain, the transmit gain, and the receive gain. The determination of the coupling gain $C_{TxRx}$ by controller 618 using Equation (7) is an example of act 630.

The disclosure will now be summarized in the following example clauses.

Clause 1. An apparatus for wireless communication, comprising:

a plurality of antennas including a first antenna and a second antenna;

a first antenna tuner coupled to the first antenna;

a second antenna tuner coupled to the second antenna;

a transmitter;

a receiver;

an antenna switch array having a first configuration in which the transmitter is coupled through the antenna switch array to drive the first antenna through the first antenna tuner and in which the second antenna tuner is coupled to a receiver node;

a first switch coupled between the receiver node and a receive path in the receiver; and a second switch coupled between the receiver node and a matched load.

Clause 2. The apparatus of clause 1, further comprising:

a controller configured to adjust the second antenna tuner through a plurality of load values while the antenna switch array is in the first configuration, the first switch is open, and the second switch is closed to determine a first coupling factor between the first antenna and the second antenna; and a directional coupler coupled to a transmit path of the transmitter and configured to sample a forward signal directed through the transmit path towards the antenna switch array and further configured to detect a reverse signal directed through the transmit path from the antenna switch array.

Clause 3. The apparatus of clause 2, wherein the controller is further configured to determine the first coupling factor while the antenna switch array is in the first configuration responsive to a ratio of the reverse signal to the forward signal at a first load value in the plurality of load values.

Clause 4. The apparatus of clause 3, wherein the plurality of load values comprises three load values.

Clause 5. The apparatus of any of clauses 2-4, wherein the controller is further configured to adjust the first antenna tuner to a load value that matches an impedance of the first antenna tuner to an impedance of the transmitter.

Clause 6. The apparatus of clause 1, wherein the apparatus comprises a user equipment.

Clause 7. The apparatus of clause 3, wherein the antenna switch array is configurable into a second configuration in which the transmitter is coupled through the antenna switch array to drive the second antenna through the second antenna tuner and in which the receiver is coupled through the antenna switch array to receive from the first antenna through the first antenna tuner.

Clause 8. The apparatus of clause 7, wherein the controller is further configured to adjust the first antenna tuner through a plurality of load values while the antenna switch array is in the second configuration to determine a second coupling factor between the first antenna and the second antenna.

Clause 9. The apparatus of clause 8, wherein the controller is configured to average the first coupling factor with the second coupling factor.

Clause 10. An apparatus for wireless communication, comprising:

a plurality of antennas including a first antenna and a second antenna;

a transmitter including a transmit path;

a receiver including a receive path;

a transmission line; and a plurality of switches configurable into a first configuration in which the transmit path is coupled to the receive path through the transmission line and in which the first antenna and the second antenna are isolated from the transmit path and the receive path, the plurality of switches being further configurable into a second configuration in which the transmit and receive paths are coupled to respective ones of the first antenna and the second antenna and in which the transmission line is isolated from the transmit and receive paths.

Clause 11. The apparatus of clause 10, further comprising:

a controller configured to measure a calibration gain between the transmit path and the receive path while the plurality of switches are in the first configuration and configured to measure an operating gain between the transmit path and the receive path while the plurality of switches are in the second configuration.

Clause 12. The apparatus of clause 11, further comprising:

a directional coupler coupled to the transmit path and configured to sample a forward signal directed through the transmit path towards the plurality of switches and further configured to detect a reverse signal directed through the transmit path from the plurality of switches.

Clause 13. The apparatus of clause 12, wherein the controller is further configured to calculate a coupling factor between the first antenna and the second antenna based upon a ratio of the reverse signal to the forward signal, the calibration gain, and the operating gain.

Clause 14. The apparatus of clause 12, further comprising:

an antenna switch array having a first configuration in which the transmit path is coupled through the antenna switch array to drive the first antenna and in which the receive path is coupled through the antenna switch array to receive from the second antenna, the antenna switch array having a second configuration in which the transmit path is coupled through the antenna switch array to drive the second antenna and in which the receive path is coupled through the antenna switch array to receive from the first antenna.

Clause 15. The apparatus of clause 10, further comprising:

a first antenna tuner coupled to the first antenna; and a second antenna tuner coupled to the second antenna.

Clause 16. An apparatus for wireless communication, comprising:

a plurality of antennas including a first antenna and a second antenna;

a transmitter including a transmit path;

a receiver including a receive path;

an antenna switch array configurable into a first configuration in which the transmit path is coupled through the antenna switch array to drive the first antenna and in which the receiver is coupled through the antenna switch array to receive from the second antenna; and a controller configured to measure an operating gain between the transmit path and the receive path while the antenna switch array is in the first configuration, the controller being further configured to estimate a coupling gain between the first antenna and the second antenna based upon the operating gain, a calibration transmit gain of the transmit path, and a calibration receive gain of the receive path.

Clause 17. The apparatus of clause 16, further comprising:

a first test port coupled between the transmit path and the first antenna for a measurement of the calibration transmit gain; and a second test port coupled between the receive path and the second antenna for a measurement of the calibration receive gain.

Clause 18. The apparatus of clause 16, wherein the antenna switch array is further configurable into a second configuration in which the transmit path is coupled through the antenna switch array to drive the second antenna and in which the receiver is coupled through the antenna switch array to receive from the first antenna.

Clause 19. A method, comprising:

transmitting a first signal through a transmitter chain to a first antenna of a user equipment;

varying a loading of a second antenna of the user equipment through each load value in a first plurality of load values during the transmitting of the first signal;

measuring a reflection coefficient of the transmitter chain for each load value in the first plurality of load values to provide a first plurality of measured reflection coefficients during the transmitting of the first signal; and calculating a first coupling factor between the first antenna and the second antenna based upon the first plurality of measured reflection coefficients and the first plurality of load values.

Clause 20. The method of clause 19, further comprising:

transmitting a second signal through the transmitter chain to the second antenna;

varying a loading of the first antenna through each load value in a second plurality of load values during the transmitting of the second signal;

measuring a reflection coefficient of the transmitter chain for each load value in the second plurality of load values to provide a second plurality of measured reflection coefficients during the transmitting of the second signal; and calculating a second coupling factor between the first antenna and the second antenna based upon the second plurality of measured reflection coefficients and the second plurality of load values.

Clause 21. The method of clause 20, further comprising: averaging the first coupling factor with the second coupling factor.

In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:

a plurality of antennas including a first antenna and a second antenna;

a first antenna tuner coupled to the first antenna;

a second antenna tuner coupled to the second antenna;

a transmitter;

a receiver;

an antenna switch array having a first configuration in which the transmitter is coupled through the antenna switch array to drive the first antenna through the first antenna tuner and in which the second antenna tuner is coupled to a receiver node and having a second configuration in which the transmitter is coupled through the antenna switch array to drive the second antenna through the second antenna tuner and in which the receiver node is coupled to the first antenna tuner;

a first switch coupled between the receiver node and a receive path in the receiver; and a second switch coupled between the receiver node and a first terminal of a matched load having a second terminal coupled to ground, the second switch configured to selectively couple the receiver node to the matched load.

2. The apparatus of claim 1, further comprising:

a controller configured to adjust the second antenna tuner through a plurality of load values while the antenna switch array is in the first configuration, the first switch is open, and the second switch is closed to determine a first coupling factor between the first antenna and the second antenna; and a directional coupler coupled to a transmit path of the transmitter and configured to sample a forward signal directed through the transmit path towards the antenna switch array and further configured to detect a reverse signal directed through the transmit path from the antenna switch array.

3. The apparatus of claim 2, wherein the controller is further configured to determine the first coupling factor while the antenna switch array is in the first configuration responsive to a ratio of the reverse signal to the forward signal at a first load value in the plurality of load values.

4. The apparatus of claim 3, wherein the plurality of load values comprises three load values.

5. The apparatus of claim 2, wherein the controller is further configured to adjust the first antenna tuner to a load value that matches an impedance of the first antenna tuner to an impedance of the transmitter.

6. The apparatus of claim 1, wherein the apparatus comprises a user equipment.

7. The apparatus of claim 2, wherein the controller is further configured to adjust the first antenna tuner through a plurality of load values while the antenna switch array is in the second configuration to determine a second coupling factor between the first antenna and the second antenna.

8. The apparatus of claim 7, wherein the controller is configured to average the first coupling factor with the second coupling factor.

9. The apparatus of claim 1, further comprising:

a transmission line, wherein the receiver includes a receive path and the transmitter includes a transmit path, and wherein the antenna switch array is further configured in the first configuration to couple the second antenna to the receive path through the transmission line, and wherein the antenna switch array is configured in the second configuration to isolate the transmission line from the transmit path and from the receive path.

10. The apparatus of claim 9, further comprising:

a controller configured to measure a calibration gain between the transmit path and the receive path while the antenna switch array is in the first configuration and configured to measure an operating gain between the transmit path and the receive path while the antenna switch array is in the second configuration.

11. The apparatus of claim 10, further comprising:

a directional coupler coupled to the transmit path and configured to sample a forward signal directed through the transmit path towards the antenna switch array and further configured to detect a reverse signal directed through the transmit path from the antenna switch array.

12. The apparatus of claim 11, wherein the controller is further configured to calculate a coupling factor between the first antenna and the second antenna based upon a ratio of the reverse signal to the forward signal, the calibration gain, and the operating gain.

13. An apparatus for wireless communication, comprising:

a plurality of antennas including a first antenna and a second antenna;

a first antenna tuner coupled to the first antenna;

a second antenna tuner coupled to the second antenna;

a transmitter;

a receiver;

an antenna switch array having a first configuration in which the transmitter is coupled through the antenna switch array to drive the first antenna through the first antenna tuner and in which the second antenna tuner is coupled to a receiver node and having a second configuration in which the transmitter is coupled through the antenna switch array to drive the second antenna through the second antenna tuner and in which the receiver node is coupled to the first antenna tuner;

a first switch coupled between the receiver node and a receive path in the receiver;

a second switch coupled between the receiver node and a first terminal of a matched load having a second terminal coupled to ground; and a controller configured to adjust the first antenna tuner to a load value that matches an impedance of the first antenna tuner to an impedance of the transmitter.

* * * * *